US 11,951,827 B2

(12) United States Patent
Gono et al.

(10) Patent No.: US 11,951,827 B2
(45) Date of Patent: Apr. 9, 2024

(54) WORK VEHICLE

(71) Applicant: KUBOTA CORPORATION, Osaka (JP)

(72) Inventors: Tsuyoshi Gono, Osaka (JP); Naoya Nihei, Osaka (JP); Keiji Takahashi, Osaka (JP); Susumu Takeoka, Osaka (JP); Shusaku Yamaguchi, Osaka (JP); Yoichi Sugihara, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 35 days.

(21) Appl. No.: 17/826,855

(22) Filed: May 27, 2022

(65) Prior Publication Data
US 2022/0281315 A1 Sep. 8, 2022

Related U.S. Application Data

(63) Continuation of application No. PCT/JP2020/047949, filed on Dec. 22, 2020.

(30) Foreign Application Priority Data

Dec. 27, 2019 (JP) ................. 2019-239897

(51) Int. Cl.
*B60K 17/06* (2006.01)
*B60K 17/10* (2006.01)
(Continued)

(52) U.S. Cl.
CPC .............. *B60K 17/06* (2013.01); *B60K 17/10* (2013.01); *B60K 23/02* (2013.01); *B62D 49/06* (2013.01);
(Continued)

(58) Field of Classification Search
CPC ........ B60K 17/06; B60K 17/10; B60K 23/02; B62D 49/06; F16H 59/54; F16H 61/4035; F16H 61/43
See application file for complete search history.

(56) References Cited

U.S. PATENT DOCUMENTS

2010/0197453 A1* 8/2010 Ichikawa ............ F16H 61/4104
477/34
2016/0046278 A1* 2/2016 Matsuzaki ............ B60W 10/08
903/930

(Continued)

FOREIGN PATENT DOCUMENTS

JP 2013-210100 A 10/2013
JP 2014-132196 A 7/2014

(Continued)

OTHER PUBLICATIONS

International Search Report and Written Opinion of the International Searching Authority issued in International Patent Application No. PCT/JP2020/047949, dated Mar. 23, 2021, along with an English translation thereof.

*Primary Examiner* — Toan C To

(74) *Attorney, Agent, or Firm* — Greenblum & Bernstein, P.L.C.

(57) ABSTRACT

The work vehicle includes a vehicle body provided with a travel device; a prime mover provided in the vehicle body; a transmission device capable of speed-changing a driving force from the prime mover and transmitting the driving force to the travel device; a transmission case housing the transmission device and being filled with lubricating oil; and (Continued)

a controller capable of switching between a warm-up operation mode in which a gear of the transmission device is rotated in a state in which transmission of power from the transmission device to the travel device is blocked and a travel operation mode in which the gear is rotated in a state in which the power is transmitted from the transmission device to the travel device.

7 Claims, 8 Drawing Sheets

(51) Int. Cl.
*B60K 23/02* (2006.01)
*B62D 49/06* (2006.01)
*F16H 59/54* (2006.01)
*F16H 61/4035* (2010.01)
*F16H 61/431* (2010.01)

(52) U.S. Cl.
CPC ......... *F16H 59/54* (2013.01); *F16H 61/4035* (2013.01); *F16H 61/431* (2013.01)

(56) References Cited

U.S. PATENT DOCUMENTS

| | | | |
|---|---|---|---|
| 2016/0053888 A1* | 2/2016 | Tsuji | B60W 30/1884 74/731.1 |
| 2016/0114668 A1* | 4/2016 | Zhang | B60K 6/12 74/730.1 |
| 2017/0174075 A1* | 6/2017 | Hashimoto | B60K 25/06 |
| 2017/0217309 A1* | 8/2017 | Hashimoto | F16H 57/025 |
| 2017/0219076 A1* | 8/2017 | Hashimoto | B60K 17/10 |
| 2018/0265053 A1* | 9/2018 | Fujiki | F16H 47/04 |
| 2020/0124170 A1* | 4/2020 | Iwaki | B60K 17/10 |
| 2020/0132169 A1* | 4/2020 | Iwaki | F16H 3/44 |
| 2021/0332875 A1 | 10/2021 | Tsuchida et al. | |
| 2022/0290748 A1* | 9/2022 | Gono | B60K 17/10 |

FOREIGN PATENT DOCUMENTS

| | | | |
|---|---|---|---|
| JP | 2018-105358 A | | 7/2018 |
| JP | 2018105358 A | * | 7/2018 |
| JP | 2019-95058 A | | 6/2019 |

* cited by examiner

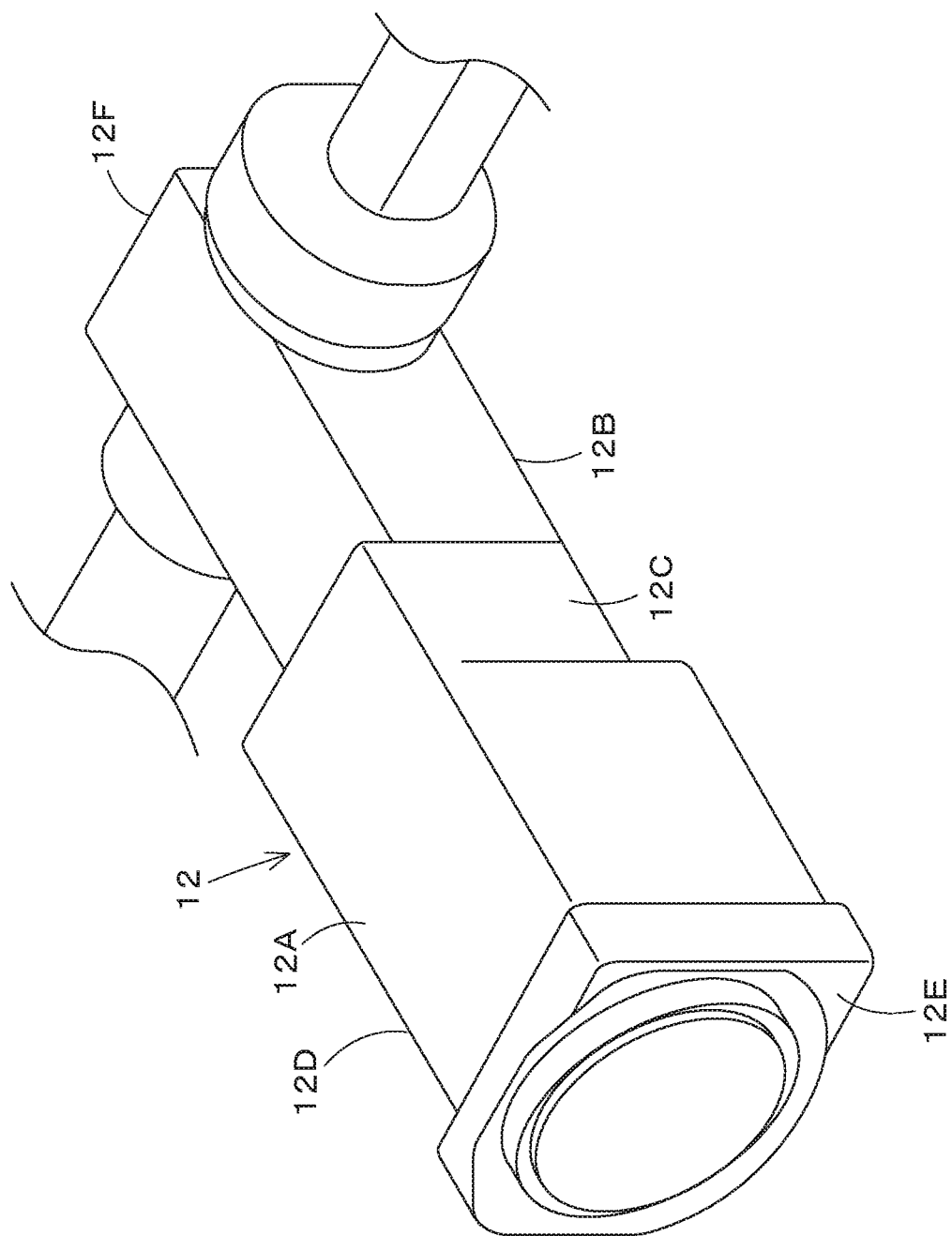

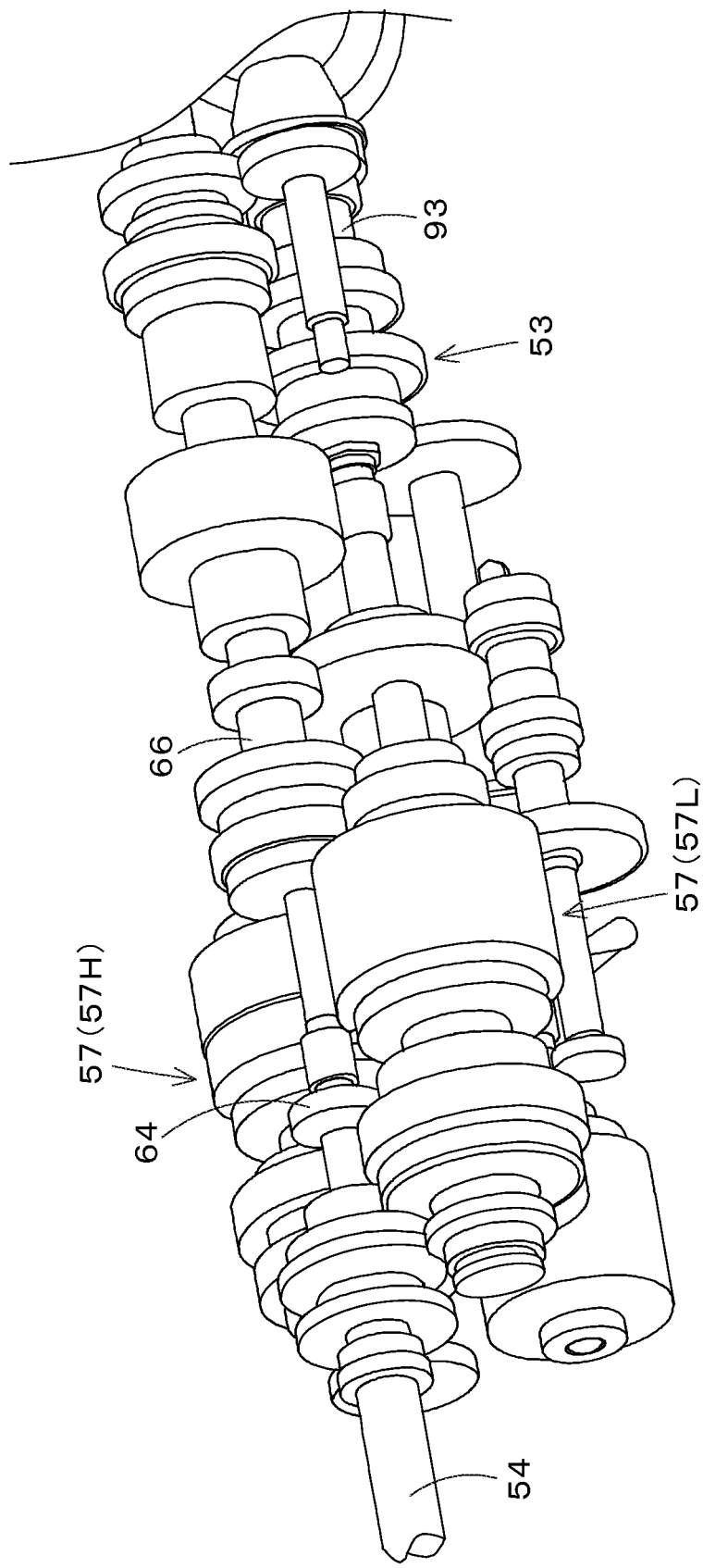

WORK VEHICLE

CROSS REFERENCE TO RELATED APPLICATIONS

This application is a continuation application of International Application No. PCT/JP2020/047949, filed on Dec. 22, 2020, which claims the benefit of priority to Japanese Patent Application No. 2019-239897, filed on Dec. 27, 2019. The entire contents of each of these applications are hereby incorporated herein by reference.

BACKGROUND OF THE INVENTION

1. Field of the Invention

The present invention relates to a work vehicle such as a tractor.

2. Description of the Related Art

Conventionally, a tractor equipped with a continuously variable transmission is known as disclosed in Japanese Unexamined Patent Application Publication No. 2019-95058. The tractor disclosed in Japanese Unexamined Patent Application Publication No. 2019-95058 includes a hydrostatic continuously variable transmission unit that has a hydraulic pump and a hydraulic motor and that receives power of an engine, speed-changes the received power to power of stepless rotation speed, and outputs the speed-changed power; and a compound planetary transmission unit that combines the received speed-changed output and the power of the engine and outputs the combined power.

SUMMARY OF THE INVENTION

In the tractor disclosed in Japanese Unexamined Patent Application Publication No. 2019-95058, connection of the compound planetary transmission unit when the tractor is braked is not taken into consideration, and behavior (traveling) or the like of the tractor during braking may change.

In view of the above-described problem, an object of the present invention is to provide a work vehicle including a continuously variable transmission and capable of improving traveling performance at the time of brake-start.

Technical measures of the present invention for solving this technical problem are characterized by the following points.

A work vehicle includes a vehicle body provided with a travel device; a continuously variable transmission including a hydraulic pump having a swash plate that changes an output in accordance with a swash-plate angle, and a travel motor having an output shaft whose rotation speed changes in accordance with the output of the hydraulic pump and being capable of transmitting power of the output shaft to the travel device; a travel operation member operable to a forward position to cause the vehicle body to travel forward, a reverse position to cause the vehicle body to travel backward, and a neutral position to keep the vehicle body from traveling forward or backward; a clutch mechanism that switches a driving force having been speed-changed by the continuously variable transmission on the basis of an operation of the travel operation member among the forward position, the reverse position, and the neutral position; a brake that brakes the travel device; a brake operation member whose operation causes a braking action of the brake; and a controller that changes a neutral target value of a driving force output from the continuously variable transmission when the travel operation member is held at the neutral position, in accordance with an operation amount of the brake operation member.

The controller may decrease the neutral target value as the operation amount increases, and increases the neutral target value as the operation amount decreases.

The controller may include a target calculation unit that calculates a forward target output value for output from the continuously variable transmission when the vehicle body travels forward by switching the travel operation member from the neutral position to the forward position, and a reverse target output value for output from the continuously variable transmission when the vehicle body travels backward by switching the travel operation member from the neutral position to the reverse position; and an output setting unit that sets the neutral target value on the basis of the operation amount of the brake operation member, the forward target output value, and the reverse target output value.

The output setting unit may set the neutral target value on the basis of a first target value that is a forward target output value when the travel operation member is switched to the forward position without the operation of the brake operation member and a second target value that is a reverse target output value when the travel operation member is switched to the reverse position without the operation of the brake operation member.

The output setting unit may set an intermediate value between the first target value and the second target value as the neutral target value.

The output setting unit may set a rotation speed of the travel motor as a driving force output from the continuously variable transmission.

The work vehicle may include a first planetary gear transmission that speed-changes the driving force having been speed-changed by the continuously variable transmission to a high-speed driving force; and a second planetary gear transmission that speed-changes the driving force having been speed-changed by the continuously variable transmission to a low-speed driving force having a speed lower than that provided by the first planetary gear transmission. The clutch mechanism may include a first clutch device capable of switching between a connected state in which a driving force from the first planetary gear transmission is transmitted to a forward drive train and a disconnected state in which the driving force from the first planetary gear transmission is not transmitted to the forward drive train; and a second clutch device capable of switching among a connected state in which a driving force from the second planetary gear transmission is transmitted to the forward drive train, a connected state in which the driving force from the second planetary gear transmission is transmitted to a reverse drive train, and a disconnected state in which the driving force from the second planetary gear transmission is not transmitted to either one of the forward drive train and the reverse drive train.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 4A is a perspective view of a transmission case.

FIG. 4B is a perspective view of the transmission device.

DETAILED DESCRIPTION OF THE PREFERRED EMBODIMENTS

Figure 1:
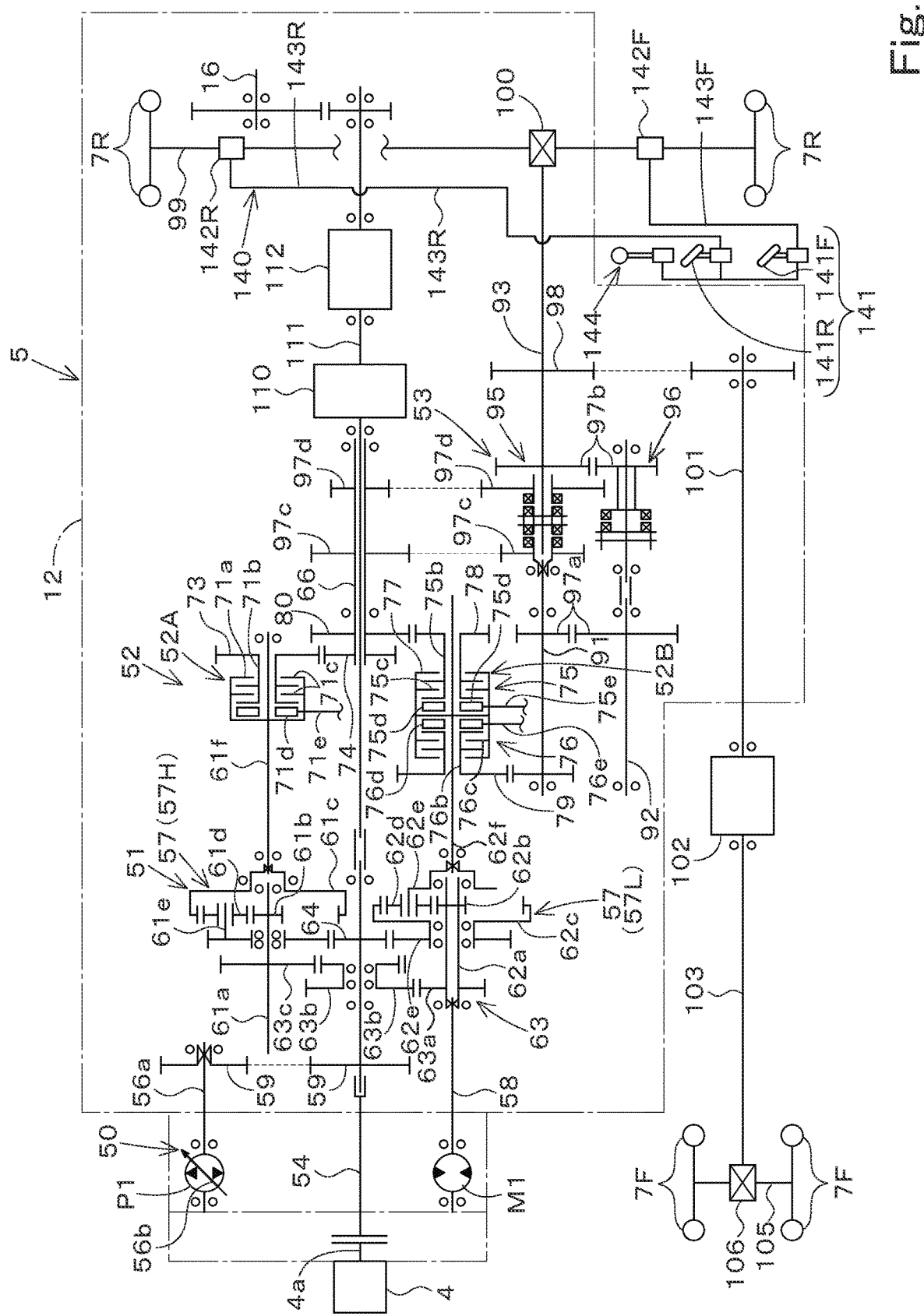
FIG. 1 is a diagram illustrating an entire transmission device.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings.

Figure 6:
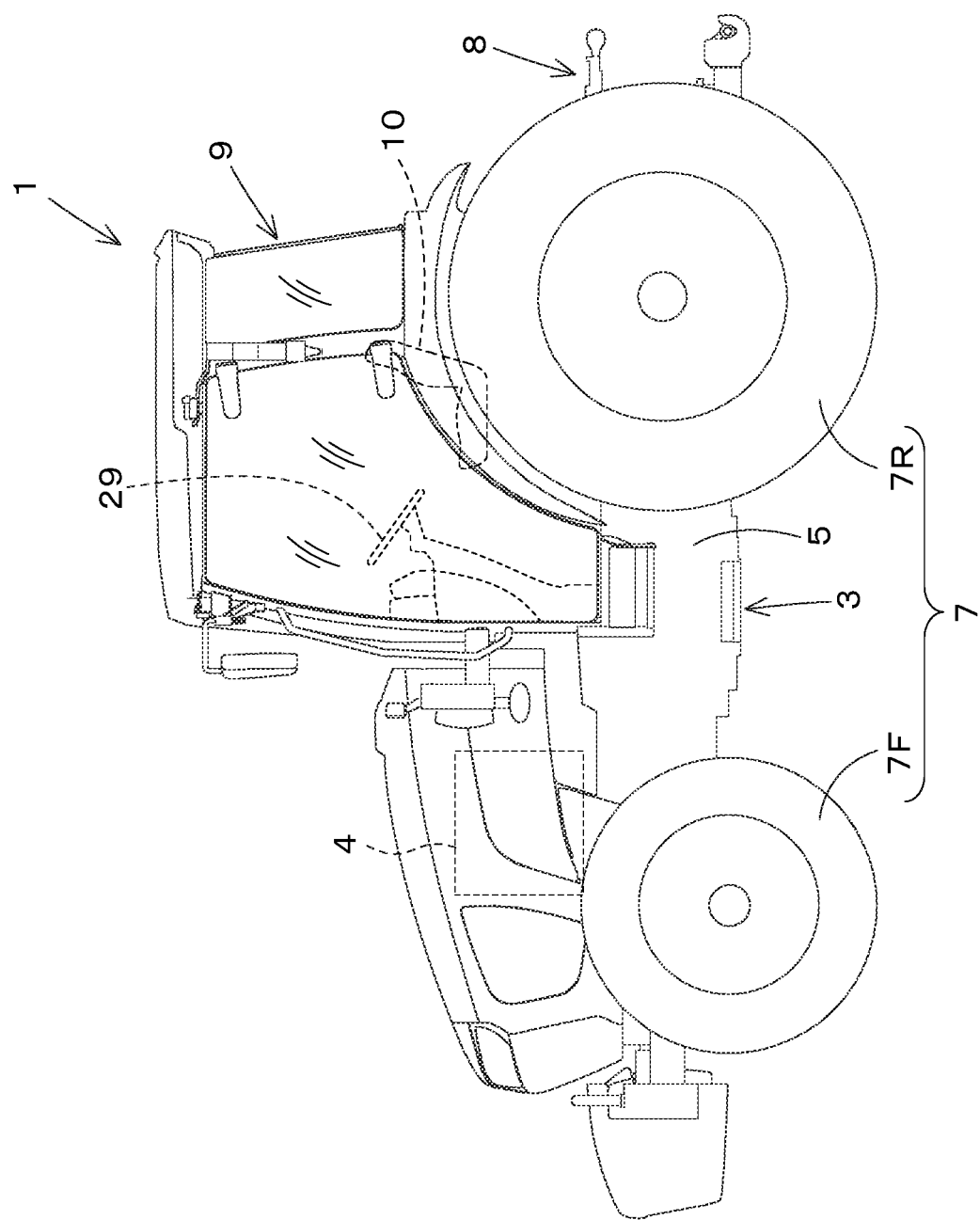
FIG. 6 is a view illustrating an entire tractor.

FIG. 6 illustrates a tractor 1 as an example of a work vehicle. The tractor 1 will be described as an example. However, the work vehicle is not limited to a tractor and is an agricultural machine such as a rice-planting machine.

As illustrated in FIG. 6, the tractor 1 includes a vehicle body 3 having a travel device 7, a prime mover 4, a transmission device 5, and a steering device 29. The travel device 7 is a device having front wheels 7F and rear wheels 7R. The front wheels 7F may be of a tire type or a crawler type. Also, the rear wheels 7R may be of a tire type or a crawler type. The prime mover 4 is an internal combustion engine such as a gasoline engine or a diesel engine. In this embodiment, the prime mover 4 is a diesel engine.

The transmission device 5 is capable of switching the thrust force of the travel device 7 by changing the speed and is capable of switching the travel device 7 between forward travel and reverse travel. The vehicle body 3 is provided with a cabin 9, and a driver seat 10 is provided in the cabin 9.

Further, a lifting device 8 is provided at a rear portion of the vehicle body 3. A working device can be attached to and detached from the lifting device 8. Further, the lifting device 8 can raise and lower the working device attached thereto. Examples of the working device include a cultivating device for cultivating, a fertilizer spraying device for spraying a fertilizer, an agrochemical spraying device for spraying an agrochemical, a harvesting device for harvesting, a reaping device for reaping grass or the like, a spreading device for spreading grass or the like, a grass collecting device for collecting grass or the like, and a shaping device for shaping grass or the like.

As illustrated in FIG. 1, the transmission device 5 is a device capable of speed-changing the driving force from the prime mover 4 and transmitting the driving force to the travel device 7. The transmission device 5 includes a continuously variable transmission 50, a planetary gear transmission mechanism 51, a clutch mechanism 52, and an auxiliary transmission mechanism 53. The transmission device 5 is housed in a transmission case 12. As illustrated in FIG. 4A, the transmission case 12 has a cubic shape with a space and includes an upper wall 12A, a lower wall 12B spaced apart from the upper wall 12A, a left side wall 12C coupling left sides of the upper wall 12A and the lower wall 12B, a right side wall 12D coupling right sides of the upper wall 12A and the lower wall 12B, a front wall 12E coupling front sides of the upper wall 12A, the left side wall 12C, and the right side wall 12D, and a rear wall 12F coupling rear sides of the upper wall 12A, the left side wall 12C, and the right side wall 12D. As illustrated in FIGS. 4A and 4B, the continuously variable transmission 50, the planetary gear transmission mechanism 51, the clutch mechanism 52, and the auxiliary transmission mechanism 53 are housed in a space surrounded by the upper wall 12A, the lower wall 12B, the left side wall 12C, the right side wall 12D, the front wall 12E, and the rear wall 12F. The transmission case 12 may have a structure in which a plurality of separate bodies are coupled to each other but is not limited thereto.

The transmission case 12 is filled with lubricating oil that lubricates the transmission device 5 (the continuously variable transmission 50, the planetary gear transmission mechanism 51, the clutch mechanism 52, and the auxiliary transmission mechanism 53).

The continuously variable transmission 50 is a device that speed-changes the driving force transmitted from the prime mover 4 in a stepless manner. In this embodiment, the continuously variable transmission 50 is a hydrostatic continuously variable transmission 50.

Figure 2:
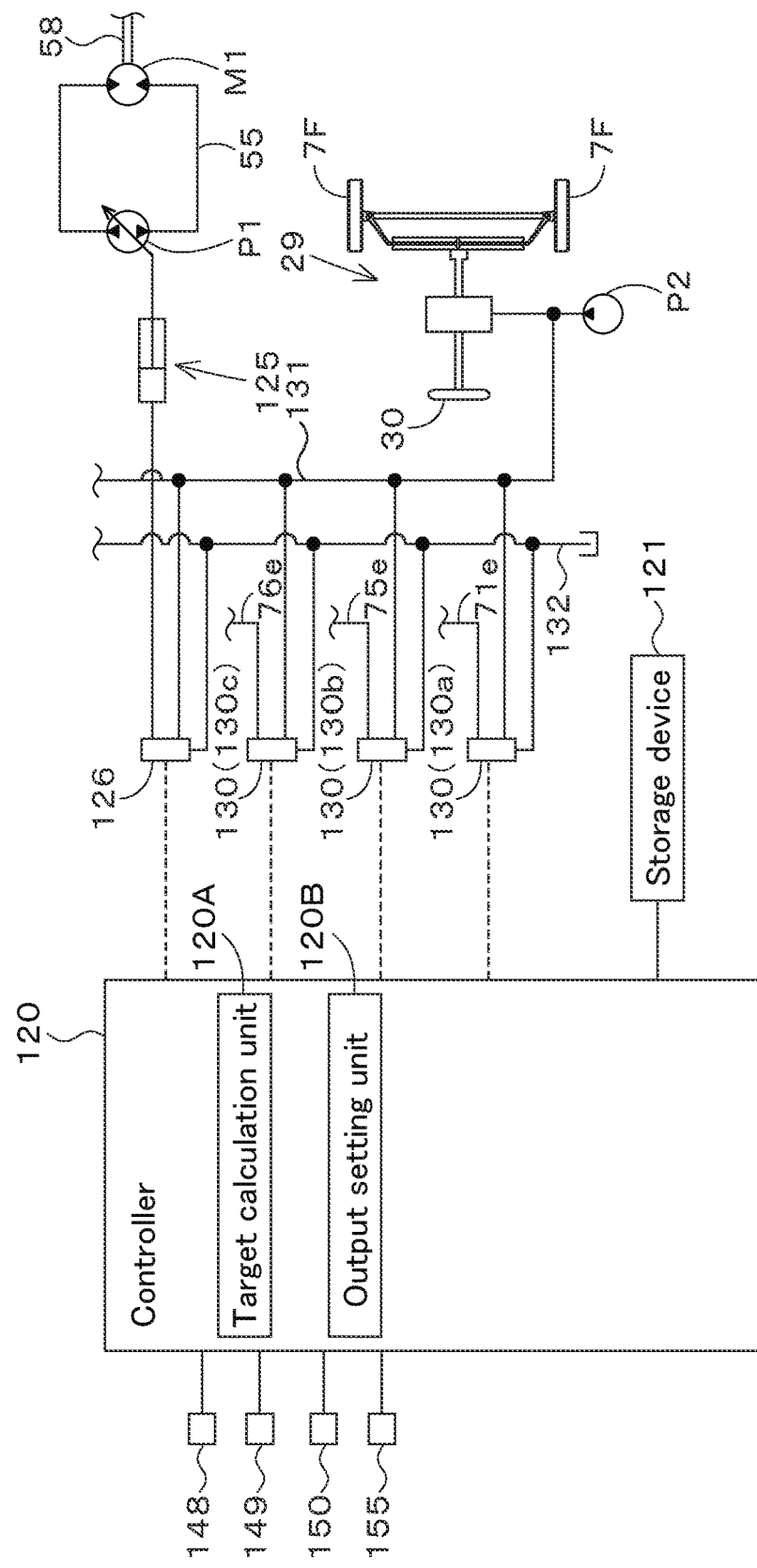
FIG. 2 is a diagram illustrating a control block diagram.

The driving force transmitted from an output shaft (crankshaft) 4a of the prime mover 4 to a main shaft (thrust shaft) 54 is changed. As illustrated in FIGS. 1 and 2, the continuously variable transmission 50 includes a hydraulic pump P1 and a travel motor M1. The hydraulic pump P1 and the travel motor M1 are connected by an oil passage (circulating oil passage) 55 through which hydraulic fluid flows. The hydraulic pump P1 has an input shaft 56a and a swash plate 56b. The hydraulic pump P1 is driven by the power transmitted to the input shaft 56a and is capable of changing an output (a discharge amount (flow rate) or pressure of the hydraulic fluid) in accordance with an angle (swash-plate angle) of the swash plate 56b that is supported in a swingable manner.

The travel motor M1 has an output shaft 58. The rotation speed of the output shaft 58 changes in accordance with the output (the flow rate or pressure of the hydraulic fluid) of the hydraulic pump P1. The power of the output shaft 58 is transmitted to the planetary gear transmission mechanism 51, and so forth, and is then transmitted to the travel device 7.

Specifically, as illustrated in FIG. 1, the input shaft 56a of the hydraulic pump P1 is connected to a drive gear mechanism 59 having, for example, a gear that rotates with the rotation of the main shaft (thrust shaft) 54, and the power of the main shaft (thrust shaft) 54 is transmitted via the drive gear mechanism 59. The output is changed in accordance with the swash-plate angle of the hydraulic pump P1 to change the rotation speed of the output shaft 58 of the travel motor M1.

The planetary gear transmission mechanism 51 is a device for further speed-changing the driving force having been speed-changed by the continuously variable transmission 50, and includes a plurality of planetary gear transmissions 57. In this embodiment, the plurality of planetary gear transmissions 57 include a first planetary gear transmission 57H and a second planetary gear transmission 57L. The first planetary gear transmission 57H is a planetary gear transmission that transmits a driving force at a high speed, and the second planetary gear transmission 57L is a planetary gear transmission that transmits a driving force having a speed lower than that provided by the first planetary gear transmission 57H.

The first planetary gear transmission 57H includes a first input shaft 61a, a first sun gear 61b, a first ring gear 61c, a plurality of first planetary gears 61d, a first carrier 61e, and a first output shaft 61f. The first input shaft 61a is rotatably supported. The driving force having been speed-changed by the continuously variable transmission 50 is transmitted to the first input shaft 61a. The first sun gear 61b is a gear that rotates with the rotation of the first input shaft 61a. The first ring gear 61c is disposed coaxially with the first sun gear 61b and is rotatably supported. The plurality of first planetary gears 61d are disposed between the first ring gear 61c and the first sun gear 61b. The plurality of first planetary gears 61d are supported by the first carrier 61e. The first output shaft 61f is supported so as to rotate with the rotation of the first ring gear 61c.

The second planetary gear transmission 57L has a second input shaft 62a, a second sun gear 62b, a second ring gear 62c, a plurality of second planetary gears 62d, a second carrier 62e, and a second output shaft 62f. The second input shaft 62a is rotatably supported. The driving force having been speed-changed by the continuously variable transmission 50 is transmitted to the second input shaft 62a. The second sun gear 62b is a gear that rotates with the rotation of the second input shaft 62a. The second ring gear 62c is disposed coaxially with the second sun gear 62b and is rotatably supported. The plurality of second planetary gears 62d are disposed between the second ring gear 62c and the second sun gear 62b. The plurality of second planetary gears 62d are supported by the second carrier 62e. The second output shaft 62f is supported so as to rotate with the rotation of the second carrier 62e.

The power on the output side of the continuously variable transmission 50, that is, the power of the output shaft 58 of the travel motor M1 is transmitted to the second planetary gear transmission 57L via the second input shaft 62a of the second planetary gear transmission 57L. The power is transmitted to the first planetary gear transmission 57H by a power transmission mechanism 63 coupled to the second input shaft 62a of the second planetary gear transmission 57L. The power transmission mechanism 63 includes a gear 63a that rotates with the rotation of the second input shaft 62a, a gear 63b that meshes with the gear 63a, and a gear 63c that is provided on the first input shaft 61a of the first planetary gear transmission 57H. The gear 63b meshes with the gear 63c.

Thus, the power of the output shaft 58 of the travel motor M1 is transmitted to the first input shaft 61a of the first planetary gear transmission 57H via the second input shaft 62a, the gear 63a, the gear 63b, and the gear 63c.

Further, a gear provided on the second ring gear 62c of the second planetary gear transmission 57L and a gear 64 provided on the main shaft (thrust shaft) 54 mesh with each other, and the gear 64 meshes with a gear provided on the first carrier 61e.

As described above, with the continuously variable transmission 50 and the planetary gear transmission mechanism 51, when the driving force output from the continuously variable transmission 50 is input to the first planetary gear transmission 57H, the driving force can be converted to a high speed, and when the driving force is input to the second planetary gear transmission 57L, the driving force can be converted to a low speed.

As illustrated in FIG. 1, the transmission device 5 includes the clutch mechanism 52. The clutch mechanism 52 can be switched between a connected state in which the driving force having been speed-changed by the planetary gear transmission mechanism 51 is connected to a transmission shaft 66 and a disconnected state in which the driving force is not connected to the transmission shaft 66. The clutch mechanism 52 includes a first clutch device 52A and a second clutch device 52B. The first clutch device 52A is a clutch capable of transmitting the driving force from the first planetary gear transmission 57H to the transmission shaft 66. The second clutch device 52B is a clutch capable of transmitting the driving force from the second planetary gear transmission 57L to the transmission shaft 66.

The first clutch device 52A and the second clutch device 52B are hydraulic clutches that are switched between a connected state and a disconnected state with hydraulic fluid.

The first clutch device 52A has a housing 71a that is rotatable together with the first output shaft 61f of the first planetary gear transmission 57H, a cylindrical shaft 71b, a friction plate 71c disposed between the housing 71a and the cylindrical shaft 71b, and a pressing member 71d. The pressing member 71d is urged in a direction away from the friction plate 71c by an urging member such as a spring (not illustrated).

An oil passage 71e for supplying and discharging a hydraulic fluid is connected to the inside of the housing 71a, and when the hydraulic fluid is supplied from the oil passage 71e to the inside of the housing 71a, the pressing member 71d moves in a pressing direction (connection direction) against the urging force of the spring. Thus, the friction plate 71c comes into pressure contact with any part on the housing 71a side, the first clutch device 52A is brought into a connected state, and the power of the first output shaft 61f is transmitted to a gear 73 that rotates together with the cylindrical shaft 71b. In contrast, when the hydraulic fluid is discharged from the inside of the housing 71a to the oil passage 71e, the pressing member 71d moves in a disconnection direction by the urging force of the spring. Thus, the friction plate 71c is separated from any part on the housing 71a side, the first clutch device 52A is brought into a disconnected state, and the power of the first output shaft 61f is not transmitted to the gear 73.

The transmission shaft 66 is provided with an input gear 74 that rotates together with the transmission shaft 66. The input gear 74 meshes with the gear (output gear) 73 on the output side of the first clutch device 52A, and when the first clutch device 52A is in the connected state, the driving force having been speed-changed to the high-speed driving force by the first planetary gear transmission 57H is transmitted to the transmission shaft 66.

The second clutch device 52B is a clutch that switches between forward travel and reverse travel, and includes a forward clutch unit 75 and a reverse clutch unit 76. The forward clutch unit 75 and the reverse clutch unit 76 have a housing 77 that rotates together with the second output shaft 62f of the second planetary gear transmission 57L.

The forward clutch unit 75 includes a cylindrical shaft 75b, a friction plate 75c disposed between the housing 77 and the cylindrical shaft 75b, and a pressing member 75d. The pressing member 75d is urged in a direction away from the friction plate 75c by an urging member such as a spring (not illustrated).

An oil passage 75e for supplying and discharging a hydraulic fluid is connected to the inside of the housing 77 on the forward clutch unit 75 side, and when the hydraulic fluid is supplied from the oil passage 75e to the inside of the housing 77, the pressing member 75d moves in a pressing direction (connection direction) against the urging force of the spring. Thus, the friction plate 75c comes into pressure contact with any part on the housing 77 side, the forward clutch unit 75 is brought into a connected state, and the power of the second output shaft 62f is transmitted to a gear 78 that rotates together with the cylindrical shaft 75b. In contrast, when the hydraulic fluid is discharged from the inside of the housing 77 to the oil passage 75e, the pressing member 75d moves in a disconnection direction by the urging force of the spring. Thus, the friction plate 75c is separated from any part on the housing 77 side, the forward clutch unit 75 is brought into a disconnected state, and the power of the second output shaft 62f is not transmitted to the gear 78.

The reverse clutch unit 76 includes a cylindrical shaft 76b, a friction plate 76c disposed between the housing 77 and the cylindrical shaft 76b, and a pressing member 76d. The pressing member 76d is urged in a direction away from the friction plate 76c by an urging member such as a spring (not illustrated).

The transmission shaft 66 is provided with an input gear 80 that rotates together with the transmission shaft 66. The input gear 80 meshes with the gear (output gear) 78 on the output side of the forward clutch unit 75, and when the forward clutch unit 75 is in the connected state, the driving force having been speed-changed to the low-speed driving force by the second planetary gear transmission 57L is transmitted to the transmission shaft 66.

An oil passage 76e for supplying and discharging a hydraulic fluid is connected to the inside of the housing 77 on the reverse clutch unit 76 side, and when the hydraulic fluid is supplied from the oil passage 76e to the inside of the housing 77, the pressing member 76d moves in a pressing direction (connection direction) against the urging force of the spring. Thus, the friction plate 76c comes into pressure contact with any part on the housing 77 side, the reverse clutch unit 76 is brought into a connected state, and the power of the second output shaft 62f is transmitted to a gear 79 that rotates together with the cylindrical shaft 76b. In contrast, when the hydraulic fluid is discharged from the inside of the housing 77 to the oil passage 76e, the pressing member 76d moves in a disconnection direction by the urging force of the spring. Thus, the friction plate 76c is separated from any part on the housing 77 side, the reverse clutch unit 76 is brought into a disconnected state, and the power of the second output shaft 62f is not transmitted to the gear 79.

The auxiliary transmission mechanism 53 includes a first transmission unit 95 provided between a first counter shaft 91 and a rear-wheel drive shaft 93, a second transmission unit 96 provided coaxially with a second counter shaft 92, and a transmission gear linked to these units. The auxiliary transmission mechanism 53 includes a first low-speed transmission gear 97a, a second low-speed transmission gear 97b, a high-speed transmission gear 97c, and a medium-speed transmission gear 97d. The auxiliary transmission mechanism 53 can change the speed to three stages of a high speed, a medium speed, and a low speed. The auxiliary transmission mechanism 53 changes the speed by using an auxiliary transmission operation member 149 switchable among a plurality of positions. The auxiliary transmission operation member 149 is provided around the driver seat 10 and is a lever capable of switching among five stages of a high-speed position, a neutral position, a medium-speed position, a neutral position, and a low-speed position. When the auxiliary transmission operation member 149 is at the neutral position, the power of the first counter shaft 91 is not transmitted to the rear-wheel drive shaft 93, that is, the driving force from the prime mover 4 is not transmitted to the travel device 7.

The rear-wheel drive shaft 93 whose speed has been changed by the auxiliary transmission mechanism 53 is connected to a rear-wheel differential device 100 to which a rear axle 99 that rotatably supports the rear wheels 7R is coupled. The driving force from the forward transmission shaft 66 is transmitted to the travel device 7 having the rear wheels 7R via the auxiliary transmission mechanism 53 and the rear-wheel drive shaft 93. Further, the driving force from the forward transmission shaft 66 is transmitted to a front-wheel transmission shaft 101 via a front-wheel transmission gear 98 provided on the rear-wheel drive shaft 93. The front-wheel transmission shaft 101 is provided with a drive conversion clutch 102 that changes rotation or the like of the front wheels 7F. A front-wheel drive shaft 103 is connected to the output side of the drive conversion clutch 102. The front-wheel drive shaft 103 is connected to a front-wheel differential device 106 to which a front axle 105 that rotatably supports the front wheels 7F is coupled, and the driving force from the forward transmission shaft 66 is transmitted to the travel device 7 having the front wheels 7F via the auxiliary transmission mechanism 53 and the rear-wheel drive shaft 93. The drive conversion clutch 102 can rotate the front wheels 7F and the rear wheels 7R at a constant speed, can rotate the front wheels 7F and the rear wheels 7R as 4WD, or can rotate only the rear wheels 7R as 2WD.

The thrust shaft 54 is provided with a PTO clutch device 110. The PTO clutch device 110 is constituted by, for example, a hydraulic clutch or the like, and switches between a state (connected state) in which the power of the thrust shaft 54 is transmitted to the PTO thrust shaft 111 and a state (disconnected state) in which the power of the thrust shaft 54 is not transmitted to the PTO thrust shaft 111 by turning ON and OFF the hydraulic clutch. A PTO transmission 112 that speed-changes the driving force (rotation) of the PTO thrust shaft 111 is provided in an intermediate portion of the PTO thrust shaft 111, and can change the rotation of the PTO thrust shaft 111, that is, the rotation of a PTO shaft 16 connected to the PTO thrust shaft 111 via a gear.

As illustrated in FIG. 1, the tractor 1 includes a brake 140. The brake 140 is a device that brakes the travel device 7. The brake 140 includes a brake operation member 141, a left brake 142F, and a right brake 142R. The brake operation member 141 is a member whose operation causes a braking action and that can be manually operated by the driver.

The brake operation member 141 includes a left brake pedal 141F and a right brake pedal 141R. The left brake pedal 141F and the right brake pedal 141R are supported in a swingable manner by the vehicle body 3 or the like, are provided in the vicinity of the driver seat 10, and can be operated by the driver. The left brake 142F and the right brake 142R are disk-type brakes, and can be switched between a braking state in which braking is performed and a release state in which braking is released. The left brake 142F is provided on the left side of the rear axle 99, and the right brake 142R is provided on the right side of the rear axle 99.

When the driver operates (depresses) the left brake pedal 141F, a left coupling member 143F coupled to the left brake pedal 141F moves in a braking direction, and the left brake 142F can be brought into a braking state. When the driver operates (depresses) the right brake pedal 141R, a right coupling member 143R coupled to the right brake pedal 141R moves in a braking direction, and the right brake 142R can be brought into a braking state. A coupling member that couples the left brake pedal 141F and the right brake pedal 141R is provided at the left brake pedal 141F and the right brake pedal 141R in an attachable and detachable manner (a coupled state in which the coupling member engages with the left brake pedal 141F and the right brake pedal 141R and the left brake pedal 141F and the right brake pedal 141R are coupled, and a non-coupled state in which the coupling member does not engage with the left brake pedal 141F and the right brake pedal 141R). When the left brake pedal 141F and the right brake pedal 141R are coupled to each other by the coupling member, it is possible to simultaneously brake with the left brake 142F and the right brake 142R by depressing one of the left brake pedal 141F and the right brake pedal 141R, and it is possible to simultaneously release the braking of the left brake 142F and the right brake 142R by releasing the depression of one of the left brake pedal 141F and the right brake pedal 141R.

As illustrated in FIG. 1, the brake operation member 141 includes a parking brake 144. The parking brake 144 is, for example, a swingable parking lever installed in the vicinity of the left brake pedal 141F and the right brake pedal 141R. When the parking lever is operated, the left brake pedal 141F and the right brake pedal 141R are locked by a link mechanism, and braking of the left brake 142F and the right brake 142R is performed.

The parking brake 144 described above is not limited to the mechanism described above. The parking brake 144 may be a mechanism for braking by locking the rotation of a gear provided on the rear-wheel drive shaft 93 by an operation with an operation member. Alternatively, the parking brake 144 may be a mechanism that brakes by being pressed against discs (brake discs) of the left brake 142F and the right brake 142R by an operation with an operation member, or may be a mechanism that brakes by electrically operating the left brake 142F and the right brake 142R.

As illustrated in FIG. 2, the tractor 1 includes a controller 120 and a storage device (memory) 121. The controller 120 includes a CPU, an electric/electronic circuit, and a program stored in the controller 120. The controller 120 performs various controls related to the tractor 1. The storage device 121 is constituted by a non-volatile memory or the like.

A plurality of electromagnetic control valves 130 for actuating the clutch mechanism 52 (the first clutch device 52A and the second clutch device 52B) are connected to the controller 120. The plurality of electromagnetic control valves 130 include a first electromagnetic control valve 130a that actuates the first clutch device 52A, a second electromagnetic control valve 130b that actuates the forward clutch unit 75 of the second clutch device 52B, and a third electromagnetic control valve 130c that actuates the reverse clutch unit 76 of the second clutch device 52B.

Each of the first electromagnetic control valve 130a, the second electromagnetic control valve 130b, and the third electromagnetic control valve 130c has a solenoid and is a valve whose opening degree changes in accordance with current excited in the solenoid. The opening degrees of the first electromagnetic control valve 130a, the second electromagnetic control valve 130b, and the third electromagnetic control valve 130c increase as the current excited in the solenoids increases, and the opening degrees thereof decrease as the current excited in the solenoids decreases. When the solenoids of the first electromagnetic control valve 130a, the second electromagnetic control valve 130b, and the third electromagnetic control valve 130c are demagnetized, that is, no current is applied, the first electromagnetic control valve 130a, the second electromagnetic control valve 130b, and the third electromagnetic control valve 130c are fully closed.

The first electromagnetic control valve 130a is connected to the oil passage 71e. The second electromagnetic control valve 130b is connected to the oil passage 75e. The third electromagnetic control valve 130c is connected to the oil passage 76e. An oil passage 131 of a hydraulic pump P2 different from the hydraulic pump P1 is connected to the first electromagnetic control valve 130a, the second electromagnetic control valve 130b, and the third electromagnetic control valve 130c, and a hydraulic fluid can be supplied thereto. An oil passage 132 for discharging the hydraulic fluid is connected to the first electromagnetic control valve 130a, the second electromagnetic control valve 130b, and the third electromagnetic control valve 130c. For example, when the first electromagnetic control valve 130a, the second electromagnetic control valve 130b, and the third electromagnetic control valve 130c are in a full-closed state, the hydraulic fluid is discharged from an output port.

When switching the clutch mechanism 52 (the first clutch device 52A and the second clutch device 52B), that is, when switching the planetary gear transmission mechanism 51 to the high-speed driving force or the low-speed driving force, the controller 120 brings one of the first clutch device 52A and the second clutch device 52B into the connected state and the other into the disconnected state.

Specifically, when the planetary gear transmission mechanism 51 provides the high-speed driving force and the vehicle body 3 is caused to travel forward (in the case of high-speed forward travel), the controller 120 outputs current (control signal) to the solenoid of the first electromagnetic control valve 130a to fully open the first electromagnetic control valve 130a, thereby switching the first clutch device 52A from the disconnected state to the connected state. Further, in the case of high-speed forward travel, the controller 120 demagnetizes the solenoids of the second electromagnetic control valve 130b and the third electromagnetic control valve 130c to fully close the second electromagnetic control valve 130b and the third electromagnetic control valve 130c, thereby bringing the second clutch device 52B into the disconnected state (neutral state).

When the planetary gear transmission mechanism 51 provides the low-speed driving force and the vehicle body 3 is caused to travel forward (in the case of low-speed forward travel), the solenoid of the first electromagnetic control valve 130a is demagnetized and the solenoid of the second electromagnetic control valve 130b is excited. Thus, the first electromagnetic control valve 130a is fully closed and the first clutch device 52A is in the disconnected state, and the second electromagnetic control valve 130b is fully opened and the forward clutch unit 75 of the second clutch device 52B is in the connected state.

When the planetary gear transmission mechanism 51 provides the low-speed driving force and the vehicle body 3 is caused to travel backward (in the case of low-speed reverse travel), the solenoid of the first electromagnetic control valve 130a is demagnetized and the solenoid of the third electromagnetic control valve 130c is excited. Thus, the first electromagnetic control valve 130a is fully closed and the first clutch device 52A is in the disconnected state, and the third electromagnetic control valve 130c is fully opened and the reverse clutch unit 76 of the second clutch device 52B is in the connected state.

Forward travel and backward travel of the vehicle body 3 are performed by a travel operation member 148. The travel operation member 148 is a member operable to a forward position F to cause the vehicle body 3 to travel forward, a reverse position R to cause the vehicle body 3 to travel backward, and a neutral position N (neutral) to keep the vehicle body 3 from traveling forward or backward. For example, the travel operation member 148 is a lever (shuttle lever) or the like disposed in front of or on a lateral side of the driver seat 10. The shuttle lever is supported in a swingable manner in three stages (the forward position F, the reverse position R, and the neutral position N) on a steering base that rotatably supports a steering wheel 30. As described above, when the shuttle lever is switched to the forward position F, one of the first clutch device 52A and the forward clutch unit 75 is in the connected state. Further, when the shuttle lever is switched to the reverse position R, the reverse clutch unit 76 is in the connected state. Further, when the shuttle lever is switched to the neutral position N, the first clutch device 52A and the second clutch device 52B (the forward clutch unit 75 and the reverse clutch unit 76) are in the disconnected state. That is, the clutch mechanism 52 (the first clutch device 52A and the second clutch device 52B) switches the driving force having been speed-changed by the continuously variable transmission 50, on the basis of the operation of the travel operation member 148 to one of the forward position F, the reverse position R, and the neutral position N.

Brake-start may be performed in which the vehicle body 3 is switched from a stopped state to a traveling state, in a state in which the vehicle body 3 is braked. That is, during brake-start, the travel operation member 148 is switched from the neutral position N to one of the forward position F and the reverse position R in a state in which the left brake pedal 141F and the right brake pedal 141R are operated (a state in which the brake operation member 141 is operated). The controller 120 changes a neutral target value of a driving force output from the continuously variable transmission 50 in a state in which the travel operation member 148 is held at the neutral position N in advance, in accordance with an operation amount of the brake operation member 141 (operation amounts of the left brake pedal 141F and the right brake pedal 141R) in order to smooth brake-start. For example, the controller 120 decreases the absolute value of the neutral target value as the operation amount (depression amount) increases, and increases the absolute value of the neutral target value as the operation amount (depression amount) decreases.

Hereinafter, setting of target values (a forward target value, a reverse target value, and a neutral target value) of the driving force output from the continuously variable transmission 50 and brake-start will be described in detail.

The controller 120 includes a target calculation unit 120A and an output setting unit 120B. The target calculation unit 120A and the output setting unit 120B are constituted by an electric/electronic circuit provided in the controller 120, a program stored in the controller 120, or the like.

The target calculation unit 120A calculates a forward target output value of a driving force output from the continuously variable transmission 50 when the vehicle body 3 travels forward by switching the travel operation member 148 from the neutral position N to the forward position F, and a reverse target output value of a driving force output from the continuously variable transmission 50 when the vehicle body 3 travels backward by switching the travel operation member 148 from the neutral position N to the reverse position R. The target calculation unit 120A obtains, for example, the forward target output value and the reverse target output value from a control map CM1 stored in the storage device 121.

Figure 3:
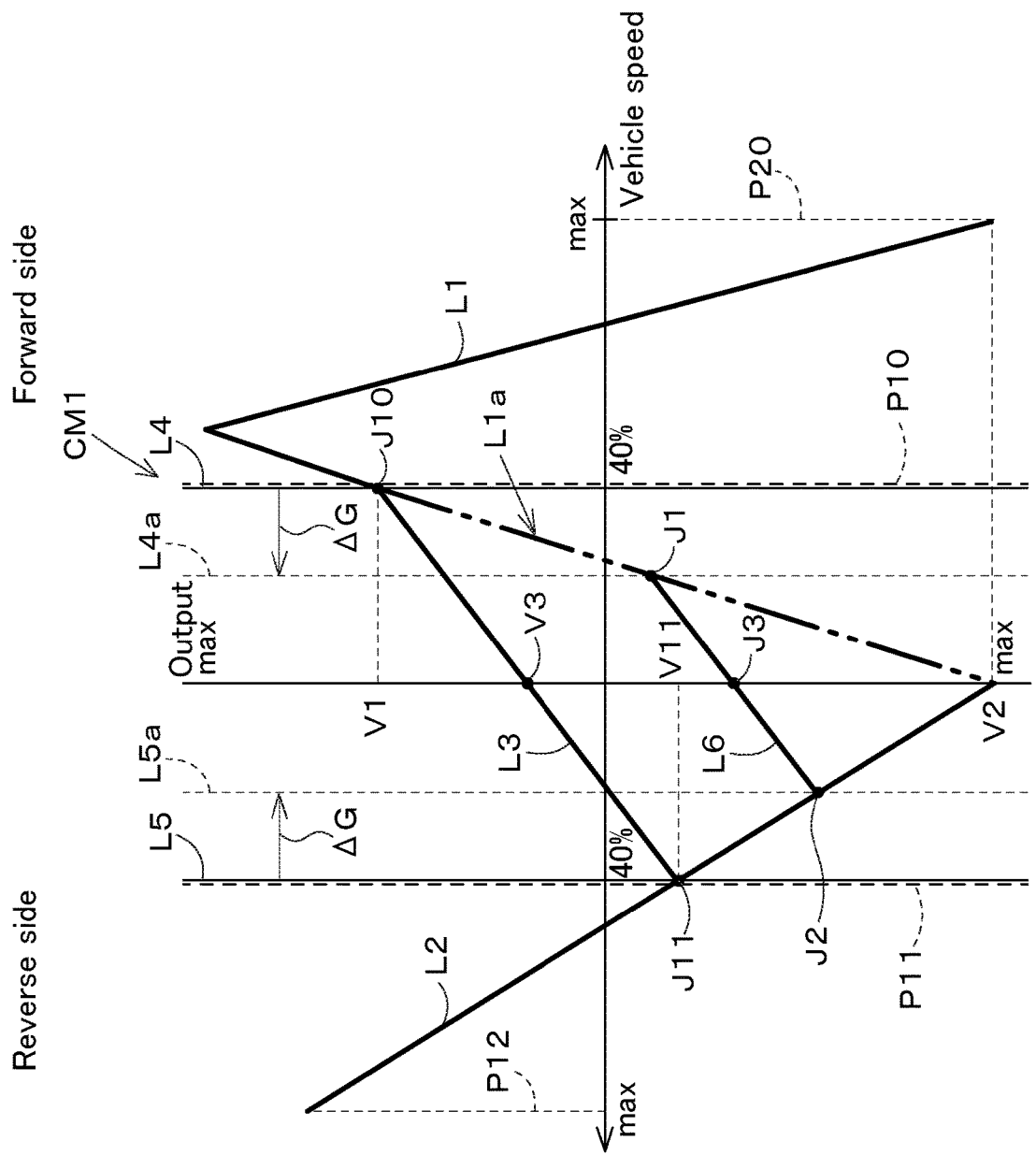
FIG. 3 is a diagram illustrating an example of a control map.

FIG. 3 illustrates an example of the control map CM1.

As illustrated in FIG. 3, the control map CM1 illustrates the relationship between the vehicle speed (travel speed) and the driving force output from the continuously variable transmission 50.

The control map CM1 includes a line L1 indicating the relationship between the vehicle speed and the driving force from the continuously variable transmission 50 when the vehicle body 3 travels forward, and a line L2 indicating the relationship between the vehicle speed and the driving force from the continuously variable transmission 50 when the vehicle body 3 travels backward. In the control map CM1, the driving force during forward travel is represented by a plus sign, and the driving force during reverse travel is represented by a minus sign. The driving force output from the continuously variable transmission 50 is, for example, the rotation speed of the travel motor M1. The forward rotation side is represented by a plus sign, and the reverse rotation side is represented by a minus sign. As illustrated in FIG. 2, the controller 120 controls the rotation speed of the travel motor M1 by controlling a regulator 125 connected to the controller 120. Specifically, the regulator 125 includes a control valve (electromagnetic control valve) 126 such as an electromagnetic valve. The electromagnetic control valve 126 is a valve that has a solenoid and whose opening degree changes in accordance with current excited in the solenoid. The opening degree of the electromagnetic control valve 126 increases as the current excited in the solenoid increases, and the opening degree of the electromagnetic control valve 126 decreases as the current excited in the solenoid decreases. When the solenoid of the electromagnetic control valve 126 is demagnetized, that is, when no current is applied, the electromagnetic control valve 126 is fully closed. With the electromagnetic control valve 126, the regulator 125 is actuated and the angle of the swash plate of the hydraulic pump P1 is changed. Thus, the flow rate or pressure of the hydraulic fluid acting on the travel motor M1 is changed and the rotation speed of the travel motor M1 can be changed.

Although the driving force output from the continuously variable transmission 50, that is, the horizontal axis in the control map CM1, is represented by the vehicle speed, the driving force may be represented by the rotation speed of the rear-wheel drive shaft 93 or the like instead of the vehicle speed.

When the vehicle body 3 travels forward, the target calculation unit 120A calculates a forward target output value on the basis of the control map CM1 and the line L1. For example, as indicated by a time point P10, when the vehicle speed during forward travel of the vehicle body 3 is set to 40%, the target calculation unit 120A sets a forward rotation speed V1 of the travel motor M1 as a forward target output value. For example, as indicated by a time point P20, when the vehicle speed during forward travel of the vehicle body 3 is set to 100% (maximum value), the target calculation unit 120A sets a reverse rotation speed V2 of the travel motor M1 as a forward target output value. That is, the target calculation unit 120A sets the rotation direction and the rotation speed of the travel motor M1 in accordance with the vehicle speed (target vehicle speed) during forward travel.

When the vehicle body 3 travels backward, the target calculation unit 120A calculates a reverse target output value on the basis of the control map CM1 and the line L2. For example, as indicated by a time point P11, when the vehicle speed during reverse travel of the vehicle body 3 is set to 40%, the target calculation unit 120A sets a reverse rotation speed V11 of the travel motor M1 as a reverse target output value. For example, as indicated by a time point P12, when the vehicle speed during reverse travel of the vehicle body 3 is set to 100% (maximum value), the target calculation unit 120A sets a forward rotation speed V2 of the travel motor M1 as a reverse target output value. That is, the target calculation unit 120A sets the rotation direction and the rotation speed of the travel motor M1 in accordance with the vehicle speed (target vehicle speed) during reverse travel.

The output setting unit 120B sets a neutral target value on the basis of a forward target output value and a reverse target output value. In the control map CM1, when a line parallel to the vertical axis at the time of switching from the neutral position N to the forward position F without the operation of the brake operation member 141 (at the time of forward non-brake-start) is L4 and a line parallel to the vertical axis at the time of switching from the neutral position N to the reverse position R without the operation of the brake operation member 141 (at the time of reverse non-brake-start) is L5, the target calculation unit 120A sets a value V1 at which the line L4 and the line L1 intersect with each other as a forward target output value (first target value) and a value V11 at which the line L5 and the line L2 intersect with each other as a reverse target output value (second target value). The output setting unit 120B sets, as a neutral target value V3, a value indicated at a position at which the vertical axis intersects with a line L3 that connects a point J10 at which the forward target output value (first target value) V1 is obtained in the line L1 and a point J11 at which the reverse target output value (second target value) V11 is obtained in the line L2.

In contrast, when the brake operation member 141 is operated to switch from the neutral position N to the forward position F (at the time of brake-start), the output setting unit 120B sets a neutral target value on the basis of a forward target output value and a reverse target output value. The output setting unit 120B sets a neutral target value on the basis of the line L1, the line L2, and a line L4a and a line L5a obtained by shifting the lines L4 and L5 to a side on which the vehicle speed decreases in accordance with the depression amount. When obtaining a neutral target value, the output setting unit 120B increases a shift amount ΔG of the line L4a and the line L5a. For example, the output setting unit 120B shifts the line L4a and the line L5a until they coincide with the vertical axis (Y axis) when the depression amount is maximum, moves the line L4a and the line L5a until they coincide with the line L4 and the line L5 when the depression amount is minimum, and positions the line L4a and the line L5a between the vertical axis (Y axis) and the line L4 and the line L5 when the depression amount is 50%.

The output setting unit 120B sets, as a neutral target value, a value of an intersection point J3 of the vertical axis (Y axis) and a line L6 connecting a first point J1, which is an intersection point of a line L1a extending from the line L1 and the line L4a, and a second point J2, which is an intersection point of the line L2 and the line L5a. That is, the output setting unit 120B sets, as a neutral target value, an intermediate value connecting a value (forward target output value) of the first point J1 at which the line L4a when the line L4a is translated in accordance with the depression amount and the line L1a intersect with each other and a value (reverse target output value) of the second point J2 at which the line L5a when the line L5a is translated in accordance with the depression amount and the line L2 intersect with each other. As described above, by changing the neutral target value in accordance with the depression amount, the driving force from the continuously variable transmission 50 can be made to reach the forward target output value or the reverse target output value as soon as possible after forward brake-start or reverse brake-start of the vehicle body 3, and the filling period of time with hydraulic fluid to the clutch mechanism 52 can be secured while a shift shock is reduced.

A work vehicle 1 includes a vehicle body 3 provided with a travel device 7; a continuously variable transmission 50 including a hydraulic pump P1 having a swash plate that changes an output in accordance with a swash-plate angle, and a travel motor M1 having an output shaft 58 whose rotation speed changes in accordance with the output of the hydraulic pump P1 and being capable of transmitting power of the output shaft 58 to the travel device 7; a travel operation member 148 operable to a forward position F to cause the vehicle body 3 to travel forward, a reverse position R to cause the vehicle body 3 to travel backward, and a neutral position N to keep the vehicle body 3 from traveling forward or backward; a clutch mechanism 52 that switches a driving force having been speed-changed by the continuously variable transmission 50 on the basis of an operation of the travel operation member 148 among the forward position F, the reverse position R, and the neutral position N; a brake 140 that brakes the travel device 7; a brake operation member 141 whose operation causes a braking action of the brake 140; and a controller 120 that changes a neutral target value of a driving force output from the continuously variable transmission 50 when the travel operation member 148 is held at the neutral position N, in accordance with an operation amount of the brake operation member 141. Accordingly, when the work vehicle 1 is started from a state in which braking has been performed, the neutral target value of the driving force output from the continuously variable transmission 50 can be changed in accordance with the operation amount of the brake operation member 141, and thus the power transmitted to the travel device 7 immediately after start can be made appropriate. That is, it is possible to reduce a shift shock at the time of brake-start, and to improve the travel performance at the time of brake-start.

The controller 120 decreases the neutral target value as the operation amount increases, and increases the neutral target value as the operation amount decreases. Accordingly, at the time of brake-start, transmission of power to the travel device 7 can be smoothed as soon as possible in accordance with the operation amount of the brake operation member 141, that is, a braking force.

The controller 120 includes a target calculation unit 120A that calculates a forward target output value for output from the continuously variable transmission 50 when the vehicle body 3 travels forward by switching the travel operation member 148 from the neutral position N to the forward position F, and a reverse target output value for output from the continuously variable transmission 50 when the vehicle body 3 travels backward by switching the travel operation member 148 from the neutral position N to the reverse position R; and an output setting unit 120B that sets the neutral target value on the basis of the operation amount of the brake operation member 141, the forward target output value, and the reverse target output value. Accordingly, in the continuously variable transmission 50, since it is possible to start from an appropriate rotation speed for forward travel and an appropriate rotation speed for reverse travel, it is possible to suppress a phenomenon in which reverse travel occurs instantaneously at start of forward travel.

The output setting unit 120B sets the neutral target value on the basis of a first target value that is a forward target output value when the travel operation member 148 is switched to the forward position F without the operation of the brake operation member 141 and a second target value that is a reverse target output value when the travel operation member 148 is switched to the reverse position R without the operation of the brake operation member 141. Accordingly, the neutral target value can be set in accordance with the balance between the forward target output value (first target value) and the reverse target output value (second target value), and the operation of the work vehicle 1 at the time of initial forward travel when the work vehicle 1 starts while being braked and the operation of the work vehicle 1 at the time of initial reverse travel can be stabilized.

The output setting unit 120B sets an intermediate value between the first target value and the second target value as the neutral target value. Accordingly, it is possible to stabilize the output of the continuously variable transmission 50 in a case where travel is started by switching from the neutral position to the forward position and in a case where travel is started by switching from the neutral position to the reverse position.

The output setting unit 120B sets a rotation speed of the travel motor M1 as a driving force output from the continuously variable transmission 50. Accordingly, the degree of transmission of power to the travel device 7 can be easily adjusted in accordance with the rotation speed of the travel motor M1.

The work vehicle 1 includes a first planetary gear transmission 57H that speed-changes the driving force having been speed-changed by the continuously variable transmission 50 to a high-speed driving force; and a second planetary gear transmission 57L that speed-changes the driving force having been speed-changed by the continuously variable transmission 50 to a low-speed driving force having a speed lower than that provided by the first planetary gear transmission 57H. The clutch mechanism 52 includes a first clutch device 52A capable of switching between a connected state in which a driving force from the first planetary gear transmission 57H is transmitted to a forward drive train and a disconnected state in which the driving force from the first planetary gear transmission 57H is not transmitted to the forward drive train; and a second clutch device 52B capable of switching among a connected state in which a driving force from the second planetary gear transmission 57L is transmitted to the forward drive train, a connected state in which the driving force from the second planetary gear transmission 57L is transmitted to a reverse drive train, and a disconnected state in which the driving force from the second planetary gear transmission 57L is not transmitted to either one of the forward drive train and the reverse drive train. Accordingly, in the configuration in which the driving force is switched between the high-speed driving force and the low-speed driving force by the first planetary gear transmission 57H and the second planetary gear transmission 57L, and the forward travel and the reverse travel are switched by the first clutch device 52A and the second clutch device 52B, it is possible to reduce a shift shock at the time of brake-start and to prevent instantaneous opposite movement (opposite travel) at the time of brake-start.

The controller 120 can switch between a warm-up operation mode and a travel operation mode. The warm-up operation mode and the travel operation mode can be switched automatically or manually. The warm-up operation mode is a mode in which a gear of the transmission device 5 is rotated in a state in which transmission of power from the transmission device 5 to the travel device 7 is blocked. The travel operation mode is a mode in which the gear is rotated in a state in which power is transmitted from the transmission device 5 to the travel device 7. That is, the travel operation mode is a mode in which the vehicle body 3 can be caused to travel by manual operation by the driver or automatic operation by the controller 120, and is a mode in which the speed is changed by actuating the transmission device 5 (the continuously variable transmission 50, the planetary gear transmission mechanism 51, the clutch mechanism 52, and the auxiliary transmission mechanism 53) as usual.

Specifically, a temperature measurement device 150 capable of measuring the temperature of lubricating oil is connected to the controller 120. When an ignition switch or the like is turned from OFF to ON and the prime mover 4 is driven (the output shaft (crankshaft) 4a of the prime mover 4 rotates), the controller 120 refers to the temperature (lubricating-oil temperature) detected by the temperature measurement device 150. When the lubricating-oil temperature is lower than, for example, $-15°$ C., that is, lower than a threshold value, and the viscosity of the lubricating oil is high (condition 1), the controller 120 automatically switches to the warm-up operation mode. In contrast, when the lubricating-oil temperature is $-15°$ C. or higher (threshold value or higher) and the viscosity of the lubricating oil is low, the controller 120 switches to the travel operation mode. The threshold value for determining the lubricating-oil temperature is an example but is not limited to the above-described temperature.

Alternatively, when the auxiliary transmission operation member 149 is at the neutral position and the parking brake 144 of the brake operation member 141 is ON (a state in which the travel device 7 is braked by the brake 140) (condition 2), the controller 120 automatically switches to the warm-up operation mode. Alternatively, the controller 120 may automatically switch to the warm-up operation mode when the auxiliary transmission operation member 149 is at the neutral position, the parking brake 144 of the brake operation member 141 is ON, and the travel operation member 148 is at the neutral position N (condition 3).

Alternatively, the controller 120 may automatically switch to the warm-up operation mode when the parking brake 144 of the brake operation member 141 is ON and the travel operation member 148 is at the neutral position N (condition 4).

The controller 120 may automatically switch to the warm-up operation mode when the conditions 1 and 2 are satisfied, may automatically switch to the warm-up operation mode when the conditions 1 and 3 are satisfied, or may automatically switch to the warm-up operation mode when the conditions 1 and 4 are satisfied.

When any one of the conditions 2, 3, and 4 is not satisfied in a state in which the condition 1 is satisfied, the condition is indicated on an indication device provided in the tractor 1, for example, a meter panel, and the driver is prompted to adjust the condition.

Upon switching to the warm-up operation mode, the controller 120 rotates the first planetary gear transmission 57H by, for example, switching the first clutch device 52A from the disconnected state to the connected state and holding the second clutch device 52B in the disconnected state. Alternatively, upon switching to the warm-up operation mode, the controller 120 rotates the second planetary gear transmission 57L by switching the second clutch device 52B from the disconnected state to the connected state while holding the first clutch device 52A in the connected state. For example, in the warm-up operation mode, the controller 120 brings the forward clutch unit 75 into the connected state and the reverse clutch unit 76 into the disconnected state, or brings the forward clutch unit 75 into the disconnected state and the reverse clutch unit 76 into the connected state. In the warm-up operation mode, the controller 120 sets a lower limit value of the rotation speed of the prime mover 4 (prime-mover rotation speed) so that the prime-mover rotation speed does not fall below the lower limit value.

After switching to the warm-up operation mode, the controller 120 may refer to the lubricating-oil temperature detected by the temperature measurement device 150 and automatically switch to the travel operation mode when the lubricating-oil temperature becomes −15° C. or higher. Alternatively, after switching to the warm-up operation mode, the controller 120 may actuate the first planetary gear transmission 57H or the second planetary gear transmission 57L in the warm-up operation mode and then switch to the travel operation mode when a predetermined period of time has elapsed.

In the above-described embodiment, the controller 120 automatically switches to the warm-up operation mode. However, the driver may manually perform switching to the warm-up operation mode. A switching device 155 capable of manually switching between the warm-up operation mode and the travel operation mode is connected to the controller 120. The switching device 155 is a switch that is provided around the driver seat 10 and can be switched between ON and OFF. When the switching device 155 is ON (condition 5), the controller 120 switches to the warm-up operation mode, and when the switching device 155 is OFF, the controller 120 switches to the travel operation mode. When the controller 120 is manually switched to the warm-up operation mode, the controller 120 may be switched to the warm-up operation mode when the condition 5 and the condition 2 are satisfied, may be switched to the warm-up operation mode when the condition 5 and the condition 3 are satisfied, or may be switched to the warm-up operation mode when the condition 5 and the condition 4 are satisfied. In a case where the tractor 1 is actuated in the warm-up operation mode, when the switching device 155 is manually switched from ON to OFF, the warm-up operation mode may be forcibly stopped and switched to the travel operation mode.

Figure 5A:
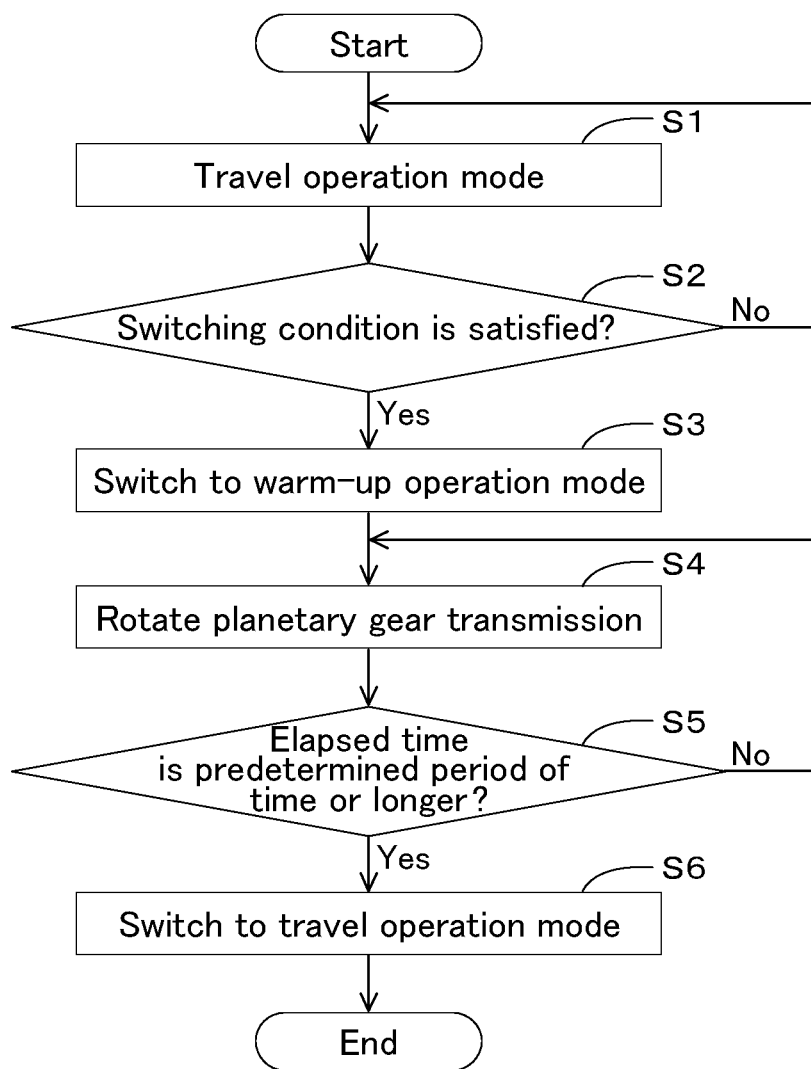
FIG. 5A is a chart presenting an operation flow of a controller.
Figure 5B:
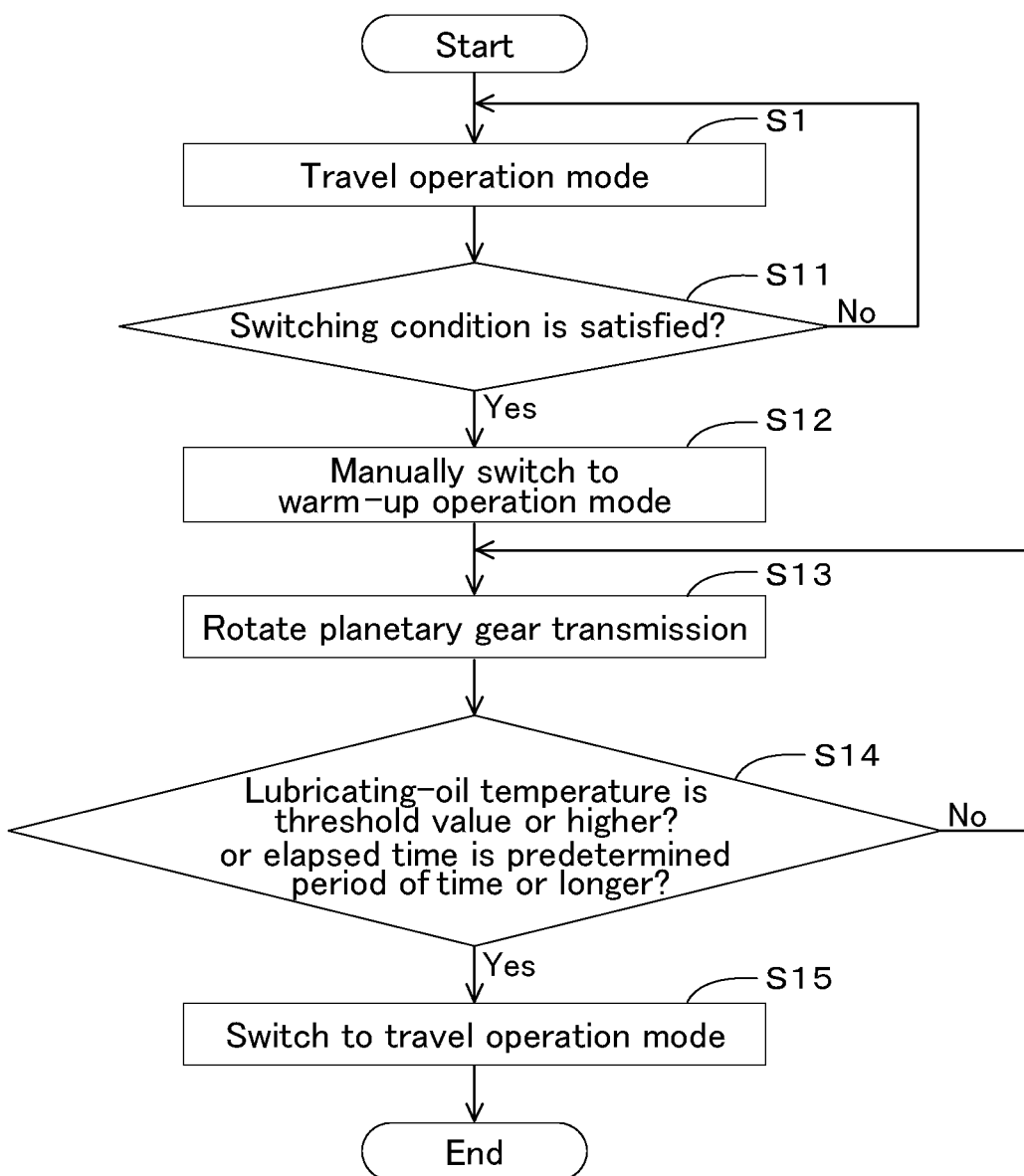
FIG. 5B is a chart presenting an operation flow of the controller different from the operation in FIG. 5A.

FIGS. 5A and 5B illustrate an example of operation flows of the controller 120.

As illustrated in FIG. 5A, when driving of the prime mover 4 is started, the controller 120 is first set to the travel operation mode (S1). The controller 120 determines whether or not a switching condition (conditions 1 and 2, or conditions 1 and 3) of the warm-up operation mode is satisfied (S2). When the switching condition of the warm-up operation mode is satisfied (S2, Yes), the travel operation mode is automatically switched to the warm-up operation mode (S3). Upon switching to the warm-up operation mode, the controller 120 rotates the planetary gear transmission 57 by, for example, bringing one of the first clutch device 52A and the second clutch device 52B into the connected state (S4). When the lubricating-oil temperature is a threshold value or higher or the elapsed time after the warm-up operation mode has been executed is a predetermined period of time or longer (S5, Yes), the controller 120 switches from the warm-up operation mode to the travel operation mode (S6). When the lubricating-oil temperature is lower than the threshold value or the elapsed time after the warm-up operation mode has been executed is shorter than the predetermined period of time (S5, No), the controller 120 continues the warm-up operation mode. When the switching device 155 is turned ON and then switched to OFF while the warm-up operation mode is continued, the operation mode is forcibly switched to the travel operation mode.

As illustrated in FIG. 5B, when driving of the prime mover 4 is started, the controller 120 is first set to the travel operation mode (S1). The controller 120 determines whether or not a switching condition of the warm-up operation mode (conditions 5 and 2, conditions 5 and 3, or conditions 5 and 4) is satisfied (S11). When the switching condition of the warm-up operation mode is satisfied (S11, Yes), the operation mode is manually switched from the travel operation mode to the warm-up operation mode (S12). Upon switching to the warm-up operation mode, the controller 120 rotates the planetary gear transmission 57 by, for example, bringing one of the first clutch device 52A and the second clutch device 52B into the connected state (S13). When the lubricating-oil temperature is a threshold value or higher or the elapsed time after the warm-up operation mode has been executed is a predetermined period of time or longer (S14, Yes), the controller 120 switches from the warm-up operation mode to the travel operation mode (S15). When the lubricating-oil temperature is lower than the threshold value or the elapsed time after the warm-up operation mode has been executed is shorter than the predetermined period of time (S14, No), the controller 120 continues the warm-up operation mode. When the switching device 155 is turned ON and then switched to OFF while the warm-up operation mode is continued, the operation mode is forcibly switched to the travel operation mode.

A work vehicle 1 includes a vehicle body 3 provided with a travel device 7; a prime mover 4 provided in the vehicle body 3; a transmission device 5 capable of speed-changing a driving force from the prime mover 4 and transmitting the driving force to the travel device 7; a transmission case 12 housing the transmission device 5 and being filled with lubricating oil; and a controller 120 capable of switching between a warm-up operation mode in which a gear of the transmission device 5 is rotated in a state in which transmission of power from the transmission device 5 to the travel device 7 is blocked and a travel operation mode in which the gear is rotated in a state in which the power is transmitted from the transmission device 5 to the travel device 7. Accordingly, traveling can be performed by rotating the gear of the transmission device 5 in the travel operation mode, whereas, in the warm-up operation mode, the temperature of lubricating oil in the transmission device 5 can be quickly increased by rotating the gear of the transmission device 5, and warm-up can be efficiently performed. That is, the temperature of the lubricating oil can be increased by the rotation of the gear of the transmission device 5.

The work vehicle 1 includes a temperature measurement device 150 capable of measuring a temperature of the lubricating oil, and the controller 120 switches to the warm-up operation mode when the temperature measured by the temperature measurement device 150 is lower than a threshold value, and switches to the travel operation mode when the temperature is the threshold value or higher. Accordingly, it is possible to automatically perform the warm-up operation when the temperature of the lubricating oil is low and the viscosity thereof is high, and it is possible to switch to traveling when the temperature of the lubricating oil is high and the viscosity thereof is low.

The controller 120 switches to the travel operation mode after a lapse of a predetermined period of time from rotation of the gear in the warm-up operation mode. Accordingly, the warm-up operation can be performed only for the predetermined period of time, and after the warm-up operation, the operation mode can be switched to the travel operation mode to perform work during traveling.

The work vehicle 1 includes a switching device 155 capable of manually switching between the warm-up operation mode and the travel operation mode. Accordingly, either one of warm-up and traveling can be performed as intended by the driver when warm-up is necessary or when the traveling is necessary by the driver or the like.

The work vehicle 1 includes a brake 140 that brakes the travel device 7, the transmission device 5 has an auxiliary transmission mechanism 53 capable of speed-changing the driving force from the prime mover 4 in a plurality of stages, and the controller 120 switches to the warm-up operation mode in a neutral state in which the auxiliary transmission mechanism 53 does not change the speed and in a state in which the travel device 7 is braked by the brake 140. Accordingly, the warm-up operation can be performed in a state in which the work vehicle 1 is appropriately stopped on a condition that the power is not transmitted to the travel device 7 by the auxiliary transmission mechanism 53 and braking is performed.

The work vehicle 1 includes a brake operation member 141 whose operation causes a braking action of the brake 140, and an auxiliary transmission operation member 149 capable of switching the auxiliary transmission mechanism 53 to the neutral state. Accordingly, the work vehicle 1 can be reliably brought into a non-movable state by the operation on the brake operation member 141 and the auxiliary transmission operation member 149 by the driver.

In the warm-up operation mode, the controller 120 brings one of the first clutch device 52A and the second clutch device 52B into the connected state. Accordingly, by bringing one of the first clutch device 52A and the second clutch device 52B into the connected state, the planetary gear transmission 57 can be actuated during the warm-up operation, and warm-up can be completed in a shorter period of time.

The present invention is also applicable to a work vehicle 1 in which power to the travel device 7 or the like is cut off (at least blocked) and that can be brought into a neutral state by a shuttle lever when the warm-up operation is performed. In this case, the warm-up operation can be performed even on a hill or the like.

Further, the controller 120 may switch to the warm-up operation mode in a case where power to the travel device 7 or the like is cut off, and can switch to the warm-up operation mode even in a state in which braking is not performed. In this case, when warm-up is executed in the warm-up operation mode, the controller 120 actuates the left brake 142F and the right brake 142R to bring them into a braking state.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
   a vehicle body provided with a travel device;
   a continuously variable transmission including a hydraulic pump having a swash plate that changes an output in accordance with a swash-plate angle, and a travel motor having an output shaft whose rotation speed changes in accordance with the output of the hydraulic pump and being capable of transmitting power of the output shaft to the travel device;
   a travel operation member operable to a forward position to cause the vehicle body to travel forward, a reverse position to cause the vehicle body to travel backward, and a neutral position to keep the vehicle body from traveling forward or backward;
   a clutch mechanism that switches a driving force having been speed-changed by the continuously variable transmission on the basis of an operation of the travel operation member among the forward position, the reverse position, and the neutral position;
   a brake that brakes the travel device;
   a brake operation member whose operation causes a braking action of the brake; and
   a controller that determines a neutral target value of a driving force output from the continuously variable transmission while the travel operation member is held at the neutral position and the travel device is stationary while braked by the brake, and that changes the neutral target value in accordance with an operation amount of the brake operation member.

2. The work vehicle according to claim 1, wherein the controller decreases the neutral target value as the operation amount increases, and increases the neutral target value as the operation amount decreases.

3. A work vehicle comprising:
   a vehicle body provided with a travel device;
   a continuously variable transmission including a hydraulic pump having a swash plate that changes an output in accordance with a swash-plate angle, and a travel motor having an output shaft whose rotation speed changes in accordance with the output of the hydraulic pump and being capable of transmitting power of the output shaft to the travel device;
   a travel operation member operable to a forward position to cause the vehicle body to travel forward, a reverse position to cause the vehicle body to travel backward, and a neutral position to keep the vehicle body from traveling forward or backward;
   a clutch mechanism that switches a driving force having been speed-changed by the continuously variable transmission on the basis of an operation of the travel operation member among the forward position, the reverse position, and the neutral position;
   a brake that brakes the travel device;
   a brake operation member whose operation causes a braking action of the brake; and
   a controller that changes a neutral target value of a driving force output from the continuously variable transmission when the travel operation member is held at the neutral position, in accordance with an operation amount of the brake operation member, wherein the controller includes
   a target calculation unit that calculates a forward target output value for output from the continuously variable transmission when the vehicle body travels forward by switching the travel operation member from the neutral position to the forward position, and a reverse target output value for output from the continuously variable transmission when the vehicle body travels backward by switching the travel operation member from the neutral position to the reverse position, and
   an output setting unit that sets the neutral target value on the basis of the operation amount of the brake operation member, the forward target output value, and the reverse target output value.

4. The work vehicle according to claim 3, wherein the output setting unit sets the neutral target value on the basis of a first target value that is a forward target output value when the travel operation member is switched to the forward position without the operation of the brake operation member and a second target value that is a reverse target output value when the travel operation member is switched to the reverse position without the operation of the brake operation member.

5. The work vehicle according to claim 4, wherein the output setting unit sets an intermediate value between the first target value and the second target value as the neutral target value.

6. The work vehicle according to claim 3, wherein the output setting unit sets a rotation speed of the travel motor as a driving force output from the continuously variable transmission.

7. A work vehicle comprising:

a vehicle body provided with a travel device;

a continuously variable transmission including a hydraulic pump having a swash plate that changes an output in accordance with a swash-plate angle, and a travel motor having an output shaft whose rotation speed changes in accordance with the output of the hydraulic pump and being capable of transmitting power of the output shaft to the travel device;

a travel operation member operable to a forward position to cause the vehicle body to travel forward, a reverse position to cause the vehicle body to travel backward, and a neutral position to keep the vehicle body from traveling forward or backward;

a clutch mechanism that switches a driving force having been speed-changed by the continuously variable transmission on the basis of an operation of the travel operation member among the forward position, the reverse position, and the neutral position;

a brake that brakes the travel device;

a brake operation member whose operation causes a braking action of the brake;

a controller that changes a neutral target value of a driving force output from the continuously variable transmission when the travel operation member is held at the neutral position, in accordance with an operation amount of the brake operation member;

a first planetary gear transmission that speed-changes the driving force having been speed-changed by the continuously variable transmission to a high-speed driving force; and a second planetary gear transmission that speed-changes the driving force having been speed-changed by the continuously variable transmission to a low-speed driving force having a speed lower than that provided by the first planetary gear transmission, wherein the clutch mechanism includes a first clutch device capable of switching between a connected state in which a driving force from the first planetary gear transmission is transmitted to a forward drive train and a disconnected state in which the driving force from the first planetary gear transmission is not transmitted to the forward drive train, and a second clutch device capable of switching among a connected state in which a driving force from the second planetary gear transmission is transmitted to the forward drive train, a connected state in which the driving force from the second planetary gear transmission is transmitted to a reverse drive train, and a disconnected state in which the driving force from the second planetary gear transmission is not transmitted to either one of the forward drive train and the reverse drive train.

* * * * *